UNITED STATES PATENT OFFICE.

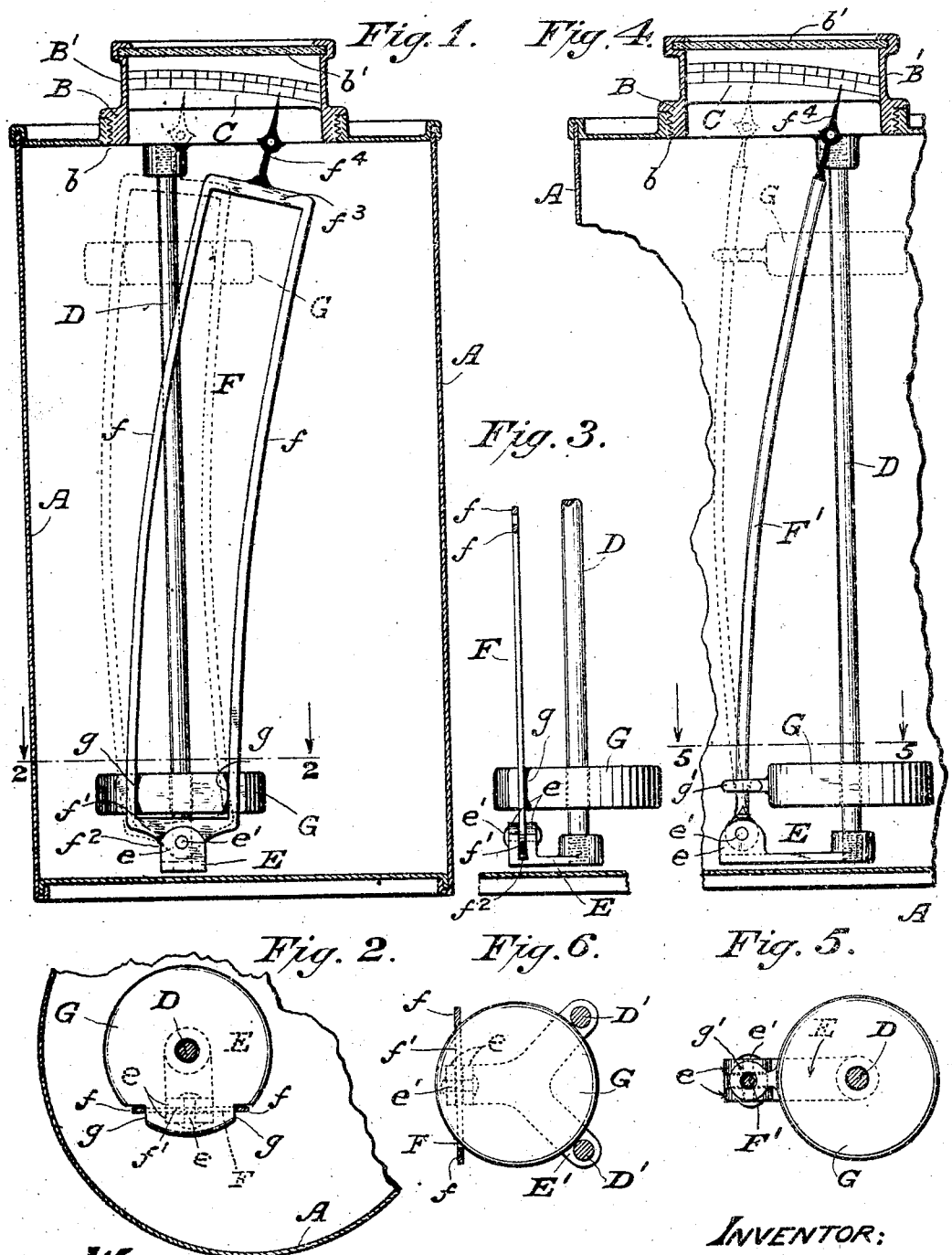

PHELPS M. FREER, OF DETROIT, MICHIGAN.

GAGE-INDICATOR.

1,058,011.  Specification of Letters Patent.  Patented Apr. 1, 1913.

Application filed November 20, 1911. Serial No. 661,280.

*To all whom it may concern:*

Be it known that I, PHELPS M. FREER, a citizen of the United States, residing at Detroit, in the county of Wayne and State of Michigan, have invented a certain new and useful Improvement in Gage-Indicators, of which the following is a full, clear, and exact description.

This invention relates to gage indicators specially adapted for use in storage tanks for liquids to constantly indicate the amount of liquid therein by means of a pointer movable across the face of a graduated dial which is always in fair view; and it consists of a combination of elements whereby changes in elevation of the surface of the liquid are followed by a float whose vertical movements are transformed into the transverse vibrating movements of an indicating pointer before the face of a graduated dial.

The objects are to so arrange the mechanical elements of the device that while they shall have free movements in the performance of their several functions they shall be under constant control and not readily responsive to the agitation or wave movements of the surface of the liquid in tanks which are mounted upon unsteady supports, such for instance as the liquid fuel tanks of automobiles or such like vehicles, for which service the arrangement shown in the drawing is especially adapted.

In many respects this invention is quite similar to the automatic gage shown in Letters Patent No. 854,481, granted May 21, 1907 to the same inventor, and it is an improvement on that device designed to overcome some objections discovered in its use.

In the drawing which discloses forms of the invention now considered most desirable though it is not intended to confine the invention to the precise forms shown, or any of them, Figure 1 is a vertical central section through a tank provided with a removable cover to which the indicating device is attached, depending from this support down into the tank as nearly as practicable to the bottom thereof. Fig. 2 is a horizontal section through parts of the device, the section being taken on the line 2, 2 of Fig. 1. Fig. 3 is a side elevation of the lower end of the supporting rod for the indicator and of other parts associated therewith. Fig. 4 is a vertical section of portions of a tank with a modification of the indicating device, shown in elevation, suspended therein. Fig. 5 is a horizontal section of the same on the line 5, 5 of Fig. 4. Fig. 6 is a plan section of another modification, in which the float is guided by a plurality of guide members engaging its edge, instead of by a single guide rod passing through a central aperture, as shown in preceding figures.

The tank A may be of any desired shape and size, and it is preferably provided with a removable cover or cap B secured by screw threads $b$ or by any other suitable means. The cap is preferably provided with a vertical neck B′ which opens at bottom into the tank and is closed at its top by a transparent plate of glass or other suitable material $b'$ seated in a liquid tight joint. In the neck below the glass closure is a graduated scale or dial gage C of any suitable form that may be easily seen and read through the glass cover. In the drawing this is shown as a vertical plate provided with suitable graduations in front of which the gage pointer may move. Or it may consist, as shown in the prior patent referred to, of a horizontal plate or diaphragm provided with a cross slot through which the free end of the pointer extends and moves past or over graduation marks at one or both sides of the slot. As far as described there is nothing of special novelty in this over the prior device.

Firmly attached to and depending from the removable cover is a straight rigid rod D which extends nearly to the bottom of the tank and has at its lower end a rigid horizontally extending foot piece E provided at its free end with lugs $e$, $e$ between which is mounted one end of an indicating member F free to swing through an arc on the pivot pin $e'$ but held against side play by the nice fit of its pivoted end. Or it might be held against side play by having its upper free end guided by a slot in the dial plate as in the before mentioned patent.

A float G either of hollow metal or of any suitable buoyant material is mounted to slide freely up or down on the rod D. In its preferred form the indicating member F is yoke shaped, being composed of two side bars $f, f$ which are joined at their lower ends by a cross bar $f'$ having a depending lug $f^2$ apertured for the pivot $e'$ and joined at their upper ends by a cross bar $f^3$ having an upward extension $f^4$ which constitutes the pointer in front of the gage dial C. The side bars of the indicator yoke are adapted to straddle with snug fit the peripheral edge of the float in such manner as to be constantly under its control. At or near a central line across the float the yoke bars may embrace the periphery of the float but, if the yoke is positioned well away from such direct central line, its bars may embrace the sides of two specially formed peripheral notches $g, g$ in the edge of the float as shown in Fig. 2, so that the indicator is under constant control of the float and is moved positively by it in both directions as the float rises or falls with the surface of the liquid in the tank.

The float moves in a direct vertical line on the guide rod D and imparts a transverse swinging movement of the indicator yoke. If the side bars of the indicator were straight the float would move it through a greater arc when near the pivot of the indicator than when more remote for any given distance of movement of the float. It is considered desirable to have the indicator move in uniform ratio with the float and to effect this result the side bars $f$ of the indicator are curved, as shown, thereby compensating for the otherwise arcual changes in the movement of the indicator arising from the changing length or radius with the movement of the float.

Figs. 4 and 5 illustrate a modification of the device in which the indicator member consists of a single curved bar F' pivotally mounted at its lower end to the foot piece E extending from supporting rod D, and provided at its upper end with a pointer $f^4$. The float is mounted upon and guided by the rod D and at one side it has an eye $g'$ which embraces the indicator rod and holds it in constant control. Fig. 4 is somewhat diagrammatic in character, the parts being shown in elevation in correct vertical relations without particular regard to their transverse arrangement. As will be readily understood by any skilled mechanic the pointer $f^4$, at the upper end of the indicator F', cannot swing back in the same plane as the guide rod D, and it is therefore proposed to bend and offset the pointer $f^4$ sidewise a sufficient distance to clear the rod D and then bend its end upwardly into parallel alinement with the member F. This is a more simple construction than that shown in Figs. 1, 2 and 3, and has some points of advantage thereover.

In Fig. 6 is shown another modification in which a plurality of supporting or guide rods D' are employed in connection with a yoked indicator F like that of Fig. 1, and pivotally mounted upon a foot E'. The float lies within the space inclosed by two fixed guide rods on one side and by the two bars $f$ of the yoked indicator on the other side and in such gentle peripheral contact with all four of these elements that it will be guided in its vertical movements by the fixed rods and will oscillate the indicator between whose bars $f$ its periphery protrudes. The two bars $f$ of the yoked indicator also serve as guide rods to hold the float in its fixed path and restrain it from surging therefrom when the surface of the liquid is agitated.

It will be noticed that in all of these arrangements the float is positively held and guided in a vertical path by the supporting rod or rods from which it cannot escape, and it is not therefore at liberty to be dashed about by any agitation or wave action of the liquid. And it will be noticed further that the float is so connected to the indicator member that neither can be moved independently of the other, their slidable connection being such that the indicator is positively controlled and swung on its pivot by the reciprocating float and therefore at all times giving a true and accurate indication of the quantity of liquid in the tank.

Having thus described the invention, what is claimed as new and useful is:

1. In a fluid gage indicator, the combination of a fixed upright guiding means, a float suitably mounted upon said guiding means whereby the float is held in a fixed path of movement, a member extending substantially parallel with the guiding means, one end of said member being pivotally secured adjacent the lower portion of the guiding means, the other end of said member being free to move and swing in a given plane, there being a slidable connection between the float and the said swinging member whereby the movement of the said member is positively controlled by the float, the movement of said float causing the free portion of the swinging member to move in a substantially linear direction.

2. In a fluid gage indicator, the combination of fixed guiding means, an indicating member pivotally supported at one end in proximity to the guiding means with a float slidably mounted and held in a fixed path by said guiding means and having positive but slidable connection with said indicating member whereby longitudinal movement of the float along the guiding means will cause the indicating member to swing on its pivot, the indicating member being curved in its length whereby its free end has uniform oscillatory movement in proportionate ratio to the sliding movement of the float along the guiding means.

In testimony whereof, I hereunto affix my signature in the presence of two witnesses.

PHELPS M. FREER.

Witnesses:
 JOHN H. STEIN,
 LEONARD P. HOWARD.